(12) United States Patent
Akama et al.

(10) Patent No.: US 9,571,619 B2
(45) Date of Patent: Feb. 14, 2017

(54) ELECTRONIC COMMUNICATION SYSTEM, IN-VEHICLE UNIT, AND CONTROL METHOD

(71) Applicant: HONDA MOTOR CO., LTD., Minato-Ku, Tokyo (JP)

(72) Inventors: Shinichi Akama, Cupertino, CA (US); Takahiro Iwata, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/915,418

(22) PCT Filed: Aug. 18, 2014

(86) PCT No.: PCT/JP2014/071555
§ 371 (c)(1),
(2) Date: Feb. 29, 2016

(87) PCT Pub. No.: WO2015/033761
PCT Pub. Date: Mar. 12, 2015

(65) Prior Publication Data
US 2016/0212253 A1    Jul. 21, 2016

(30) Foreign Application Priority Data

Sep. 4, 2013  (JP) .................................. 2013-183358

(51) Int. Cl.
*H04M 1/60* (2006.01)
*H04W 4/00* (2009.01)
(Continued)

(52) U.S. Cl.
CPC ........ *H04M 1/6075* (2013.01); *G01C 21/3664* (2013.01); *G01C 21/3688* (2013.01);
(Continued)

(58) Field of Classification Search
CPC ............ G01C 21/3664; G01C 21/3688; G01C 21/3697; G01C 11/02; G06F 17/00; G06F 3/0488; G06F 3/1454; H04W 4/00; H04W 4/04; H04W 92/08; H04W 8/24; B60K 35/00; H04M 1/72527; H04M 1/72577; H04M 1/6075
See application file for complete search history.

(56) References Cited

U.S. PATENT DOCUMENTS

2007/0203646 A1* 8/2007 Diaz .................. G01C 21/3688
                                                              701/469
2010/0220250 A1* 9/2010 Vanderwall ............ G01C 11/02
                                                              348/837
(Continued)

FOREIGN PATENT DOCUMENTS

JP    2013-005213 A    1/2013
JP    2013-012823 A    1/2013
(Continued)

OTHER PUBLICATIONS

PCT/ISA/210 of PCT/JP20141071555 of which this application is the National Phase.

*Primary Examiner* — Thanh Le
(74) *Attorney, Agent, or Firm* — Carrier Blackman & Associates, P.C.; Joseph P. Carrier; Jeffrey T. Gedeon

(57) ABSTRACT

This electronic communication system includes: a mobile terminal; and an in-vehicle unit, wherein the mobile terminal includes: a mobile-side first communication portion; a mobile-side second communication portion; and an application functional portion, and wherein the in-vehicle unit includes: a vehicle-side first communication portion; a vehicle-side second communication portion; and reproduction portions.

9 Claims, 9 Drawing Sheets

(51) Int. Cl.
*H04W 4/04* (2009.01)
*H04W 92/08* (2009.01)
*G01C 21/36* (2006.01)

(52) U.S. Cl.
CPC .............. *H04W 4/00* (2013.01); *H04W 4/04* (2013.01); *H04W 92/08* (2013.01)

(56) References Cited

U.S. PATENT DOCUMENTS

| | | |
|---|---|---|
| 2013/0190978 A1 | 7/2013 | Kato et al. |
| 2015/0298548 A1* | 10/2015 | Maru ................. G01C 21/3697 715/234 |
| 2016/0159218 A1* | 6/2016 | Kang .................... B60K 35/00 701/36 |
| 2016/0231977 A1* | 8/2016 | Yamada ................ G06F 3/1454 |

FOREIGN PATENT DOCUMENTS

| | | |
|---|---|---|
| JP | 2013-077968 A | 4/2013 |
| WO | 2012/036279 A1 | 3/2012 |

\* cited by examiner

ELECTRONIC COMMUNICATION SYSTEM, IN-VEHICLE UNIT, AND CONTROL METHOD

TECHNICAL FIELD

The present invention relates to an electronic communication system, an in-vehicle unit, and a control method.

The present application claims priority based on Japanese Patent Application No. 2013-183358 filed on Sep. 4, 2013, the contents of which are incorporated herein by reference.

BACKGROUND ART

In recent years, multifunctional-type mobile phones such as those represented by multifunctional mobile phone terminals (smartphones) have come into widespread use. With various applications installed, multifunctional mobile phone terminals achieve a variety of functions. Among those applications, many have a function such as that of an automotive navigation system, which has been conventionally built into an in-vehicle unit. As a result of this, these days, there has been an increasing desire to utilize such a function, which is mounted in a multifunctional mobile phone terminal, in an in-vehicle unit.

In connection with this, an electronic system is known in which an information terminal and an electronic unit such as an in-vehicle unit are able to communicate with each other through a plurality of communication systems (for example, see Patent Document 1). Furthermore, a vehicular communication system is known in which an application executed in a mobile terminal unit and an application executed in a vehicular communication unit are caused to operate cooperatively with each other, the mobile terminal unit and the vehicular communication unit being able to communicate with each other through a plurality of communication systems (for example, see Patent Document 2). Furthermore, a display system is known in which a mobile communication terminal and a display unit, which are able to communicate with each other through a plurality of communication systems, respectively transmit and receive pieces of information in accordance with their respective communication systems (for example, see Patent Document 3).

RELATED ART DOCUMENT

Patent Document

Patent Document 1: Japanese Unexamined Patent Application, First Publication No. 2013-77968
Patent Document 2: Japanese Unexamined Patent Application, First Publication No. 2013-12823
Patent Document 3: Japanese Unexamined Patent Application, First Publication No. 2013-5213

SUMMARY

Problems to be Solved by the Invention

However, in conventional electronic systems, vehicular communication systems, display systems, and so on, information acquirable by the side of the information terminal or the side of the in-vehicle unit is limited. As a result, implementable processing of the system is limited.

The present invention has been achieved in view of the above problem in the conventional technique, and provides an electronic communication system, an in-vehicle unit, and a control method that are capable of implementing various types of control by the processing on the side of a mobile-type terminal.

Means for Solving the Problem

Aspects of the present invention have the following configurations.

(1) An electronic communication system according to a first aspect of the present invention includes: a mobile-type terminal; and an in-vehicle unit that communicates with the mobile-type terminal, in which the mobile-type terminal includes: a mobile-side first communication portion that receives information, which the in-vehicle unit has acquired in a motor vehicle, via communication to a first communication specification; a mobile-side second communication portion that transmits an image or a sound, which has been generated in the mobile-type terminal, to the in-vehicle unit via communication to a second communication specification; and an application functional portion that generates the image or the sound based on information received from the in-vehicle unit, and in which the in-vehicle unit includes: a vehicle-side first communication portion that transmits information, which the in-vehicle unit has acquired in the motor vehicle, to the mobile-type terminal via the communication to the first communication specification; a vehicle-side second communication portion that receives the image or the sound, which has been generated in the mobile-type terminal, via the communication to the second communication specification; and reproduction portions that reproduce the image or the sound that has been received.

(2) The electronic communication system as set forth above in (1), in which the mobile-type terminal may further include an information provision portion that receives a request from the application functional portion via an API (Application Programming Interface), that controls the mobile-side first communication portion so as to transmit the received request to the in-vehicle unit, and that provides the application functional portion with the information, which the mobile-side first communication portion has received from the in-vehicle unit, as a response to the API.

(3) The electronic communication system as set forth above in (1) or (2), in which the in-vehicle unit may adopt a wired communication specification as the second communication specification, and may further include an authentication portion that, when communication to the first communication specification is conducted and also a physical connection for conducting communication to the second communication specification is established, performs authentication processing according to the second communication specification.

(4) The electronic communication system as set forth above in (3), in which the in-vehicle unit may further include an input portion that receives an input operation from a user, and in which, when communication to the first communication specification is conducted and also a physical connection for conducting communication to the second communication specification is established, the authentication portion may do an output of inquiring whether to start transmission of information, which the in-vehicle unit has acquired via in-vehicle communication, to the mobile-type terminal via communication to the first communication specification or not if the second communication specification is a given communication specification, and the authentication portion may perform authentication processing for starting the transmission if an input operation indicative of affirmation to the inquiry is performed to the input portion.

(5) An in-vehicle unit according to a second aspect of the present invention is an in-vehicle unit that communicates with a mobile-type terminal, includes: a first communication portion that transmits information, which is acquirable in a motor vehicle provided with the in-vehicle unit, to the mobile-type terminal via communication to a first communication specification; a second communication portion that receives an image or a sound, which has been generated in the mobile-type terminal, via communication to a wired, second communication specification; reproduction portions that reproduce the image or the sound that has been received; and an authentication portion that, when communication to the first communication specification is conducted and also a physical connection for conducting communication to the second communication specification is established, performs authentication processing according to the second communication specification.

(6) The in-vehicle unit as set forth above in (5) may further include an input portion that receives an input operation from a user, in which, when communication to the first communication specification is conducted and also a physical connection for conducting communication to the second communication specification is established, the authentication portion may do an output of inquiring whether to start transmission of information, which the in-vehicle unit has acquired via in-vehicle communication, to the mobile-type terminal via communication to the first communication specification or not if the second communication specification is a given communication specification, and the authentication portion may perform authentication processing for starting the transmission if the input portion receives information indicative of affirmation to the inquiry as an input from the user.

(7) A control method of an electronic communication system according to a third aspect of the present invention includes a mobile-type terminal and an in-vehicle unit that communicates with the mobile-type terminal, in which the mobile-type terminal: receives information, which the in-vehicle unit has acquired in a motor vehicle, via communication to a first communication specification; transmits an image or a sound, which has been generated in the mobile-type terminal, to the in-vehicle unit via communication to a second communication specification; and generates the image or the sound based on information received from the in-vehicle unit, and in which the in-vehicle unit: transmits information, which the in-vehicle unit has acquired in the motor vehicle, to the mobile-type terminal via communication to the first communication specification; receives the image or the sound, which has been generated in the mobile-type terminal, via communication to the second communication specification; and reproduces the image or the sound that has been received.

Advantage of the Invention

According to the invention as set forth above in (1) and (7), the electronic communication system transmits information related to the information, which the in-vehicle unit has acquired in the motor vehicle, to the mobile-type terminal via communication to the first communication specification, and transmits an image or a sound, which the mobile-type terminal has generated, to the in-vehicle unit via communication to the second communication specification. Therefore, in the in-vehicle unit, it is possible to reproduce the image and sound that have been generated in the mobile-type terminal based on the information in the motor vehicle. Namely, according to the electronic communication system, it is possible to achieve various types of control by the processing on the side of the mobile-type terminal.

According to the invention as set forth above in (2), the mobile-type terminal of the electronic communication system receives a request from the application functional portion via the API, and transmits the received request to the in-vehicle unit, to thereby acquire the information that has been acquired on the side of the in-vehicle unit. Therefore, it is possible to improve the compatibility of the application functional portion.

According to the invention as set forth above in (3), the electronic communication system performs authentication processing according to the wired, second communication specification. Therefore, the mobile-type terminal and the in-vehicle unit that adopt various types of second communication specifications are capable of communicating with each other.

According to the invention as set forth above in (4), when a physical connection for allowing the mobile-type terminal and the in-vehicle unit to communicate with each other to the wired, second communication specification is established, the electronic communication system inquires whether to start transmission of the information, which the in-vehicle unit has acquired via in-vehicle communication, to the mobile-type terminal via communication to the first communication specification or not. If an input operation indicative of affirmation to the inquiry is performed to the input portion, the electronic communication system performs authentication processing for starting the transmission. Therefore, it is possible to inhibit operations that the user does not intend.

According to the invention as set forth above in (5), the in-vehicle unit: transmits and receives information related to the information, which the in-vehicle unit has acquired in the motor vehicle via communication to the first communication specification; receives an image or a sound, which the mobile-type terminal has generated, via communication to the second communication specification; and reproduces the received image and the sound. Therefore, in the mobile-type terminal, it is possible to acquire an image and sound that has been generated based on the information that its own unit has transmitted, and to reproduce them.

According to the invention as set forth above in (6), when a physical connection for allowing the mobile-type terminal and the in-vehicle unit to communicate with each other to the wired, second communication specification is established, the in-vehicle unit inquires whether to start transmission of the information, which its own unit has acquired via in-vehicle communication, to the mobile-type terminal via communication to the first communication specification or not. If an input operation indicative of affirmation to the inquiry is performed to the input portion, the electronic communication system performs authentication processing for starting the transmission. Therefore, it is possible to inhibit operations that the user does not intend.

DESCRIPTION OF THE EMBODIMENTS

Figure 1:
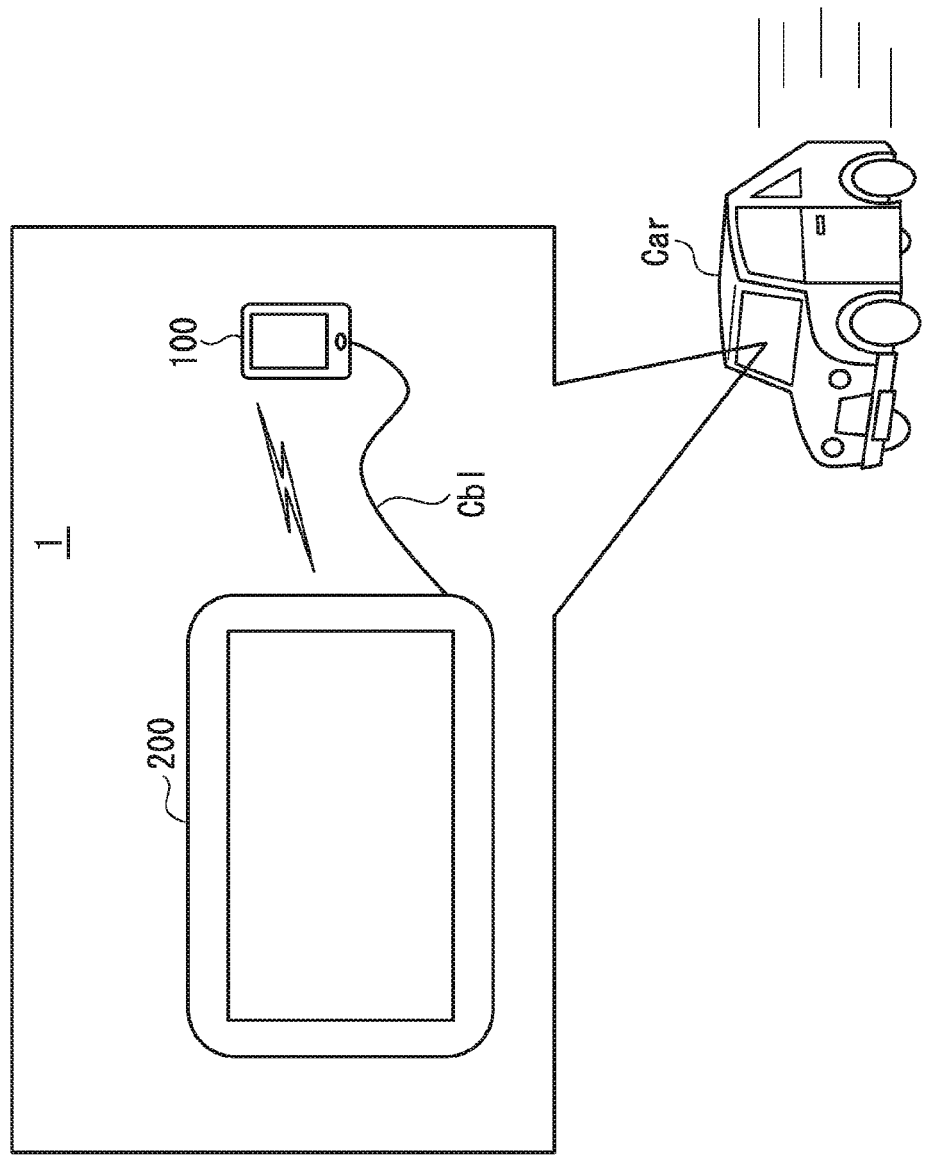
FIG. 1 is a diagram showing an example of how an electronic communication system 1 is utilized.

Hereunder is a description of an embodiment of the present invention, with reference to the drawings. FIG. 1 is a diagram showing an example of how an electronic communication system 1 according to a first embodiment is utilized. The electronic communication system 1 according to the first embodiment, for example, includes: a mobile-type terminal 100; and an in-vehicle display unit (in-vehicle unit) 200. The mobile-type terminal 100 is, for example, a multifunctional mobile phone terminal (smartphone), but may be another type of portable information terminal such as a mobile phone terminal, a tablet PC (Personal Computer), a notebook PC, an electronic book reader, or a PDA (Personal Digital Assistant).

The mobile-type terminal 100 is connected to the in-vehicle display unit 200 mounted in an automobile (Car) so as to be able to communicate according to a plurality of specifications (for example, wireless communication, or wired communication over a cable Cbl). Wireless communication is conducted under, for example, the Bluetooth (registered trademark) standard. Furthermore, wireless communication may be conducted via wireless LAN (Local Area Network), Wi-Fi Direct (registered trademark), or the like. On the other hand, wired communication over the cable Cbl is conducted under, for example, the HDMI (High-Definition Multimedia Interface, registered trademark) standard, USB (Universal Serial Bus), or the like. The mobile-type terminal 100 has various applications installed therein, and has a variety of functions according to the started application. As an example of these functions, an automotive navigation system and a vehicle audio can be listed.

The mobile-type terminal 100 acquires vehicle information (described later) from the in-vehicle display unit 200 via, for example, wireless communication. Then, based on the acquired vehicle information, the mobile-type terminal 100 generates images and sounds of the active application. Furthermore, the mobile-type terminal 100 acquires information indicative of an input from the user that has been received by the in-vehicle display unit 200. Then, based on the acquired information, the mobile-type terminal 100 generates images and sounds corresponding to various operations performed by the active application or the OS (Operating System). The mobile-type terminal 100 outputs these generated images and sounds to a display portion or a speaker of its own unit (described later) and causes them to be reproduced. Furthermore, the mobile-type terminal 100 outputs the generated images and sounds to the in-vehicle display unit 200 over the cable Cbl, to thereby make it possible to cause the in-vehicle display unit 200 to reproduce the images and sounds.

The in-vehicle display unit 200 is, for example, a unit provided with a display portion and a speaker, and may be a dedicated unit for implementing the present invention. Alternatively, an automotive navigation unit, a sub display, an in-vehicle television receiver, or the like may be used also as the in-vehicle display unit 200. From the automobile (Car), the in-vehicle display unit 200 acquires, as vehicle information, information that is acquirable via a CAN (Controller Area Network) communication, information that is acquirable from various sensors mounted in the automobile (Car), or other information. The in-vehicle display unit 200 transmits the acquired vehicle information to the mobile-type terminal 100 via wireless communication. Furthermore, the in-vehicle display unit 200 receives an input from the user by means of an input reception portion (described later), and outputs information indicative of the received input from the user to the mobile-type terminal 100 over the cable Cbl. The information indicative of the input from the user is information related to, for example, the coordinates at which a touchscreen is touch-operated, but may be information about the fact that buttons have been depressed, information about the fact that switches have been turned on/off, or other information.

The in-vehicle display unit 200 acquires various images and sounds from the mobile-type terminal 100, and outputs the acquired images and sounds to a display portion and a speaker (described later) of its own unit. Thus, the mobile-type terminal 100 outputs various images and sounds to the in-vehicle display unit 200 and then the in-vehicle display unit 200 reproduces these, to thereby allow the user to utilize the electronic communication system 1 as an automotive navigation system, a vehicle audio, or the like. Note that the pieces of information that are transmitted and received via wireless communication and via the wired communication may be in a reversed relationship (for example, images and sounds may be transmitted and received in a wireless manner, and vehicle information may be transmitted and received in a wired manner.

Figure 2:
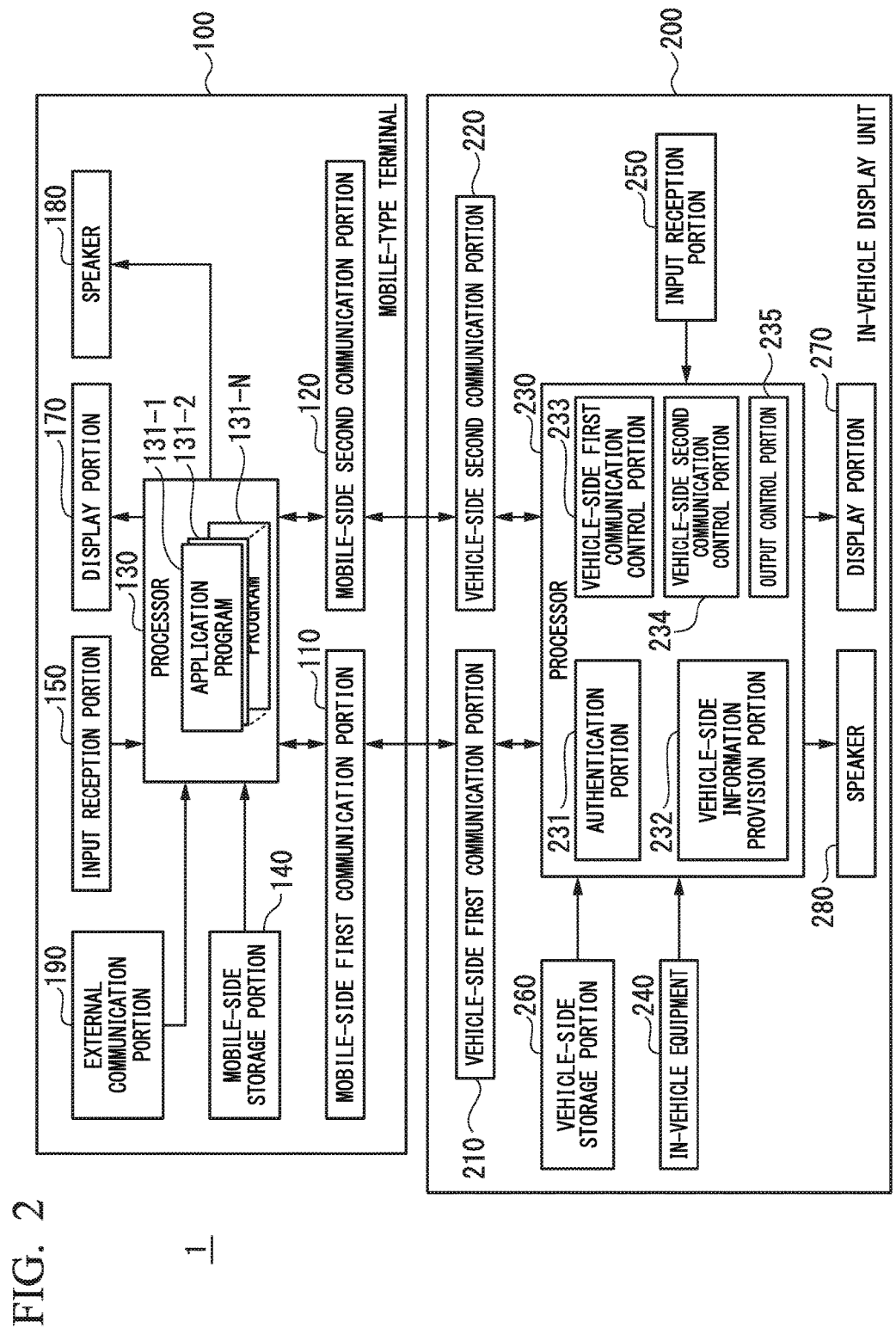
FIG. 2 is a schematic block diagram showing an example of functional configuration of the electronic communication system 1.

FIG. 2 is a schematic block diagram showing an example of a functional configuration of the electronic communication system 1. The mobile-type terminal 100 includes, for example: a mobile-side first communication portion 110; a mobile-side second communication portion 120; a processor 130; a mobile-side storage portion 140; an input reception portion 150; a display portion 170; and a speaker 180.

The mobile-side first communication portion 110 is, for example, a wireless communication module that is provided with a Bluetooth antenna and performs a wireless communication based on the Bluetooth standard, and here, conducts communication by use of the 2.4 GHz band in the ISM (Industry Science Medical band) bands. In the wireless communication system under the Bluetooth standard, a spread spectrum communication on the frequency hopping (FH) system is utilized. The frequency range of the 2.4 GHz band is divided into 79 frequency channels (hereinafter, each referred to as communication channel) in 1-MHz intervals. Based on the hopping pattern, the frequency channels to be used are switched in a timeshared manner in every time slot (frequency hopping). The wireless communication system under the Bluetooth standard is performed in the master-slave system, and the management of the hopping pattern is performed by the master. By use of the same hopping pattern, it is possible to form a wireless network called the piconet between one master and up to seven slaves. Based on the Bluetooth standard, the mobile-side first communication portion 110 performs a wireless communication between itself and a vehicle-side first communication portion 210 of the in-vehicle display unit 200.

The mobile-side second communication portion 120 includes hardware for conducting communication based on, for example, the HDMI (registered trademark) standard. The mobile-side second communication portion 120 includes, for example: an HDMI terminal to which an HDMI cable is to be connected; and an interface portion capable of transmitting and receiving image signals, audio signals, and various pieces of information related to image formats between itself and a device that outputs images and sounds. This interface portion has a plurality of channels, and various images or sounds are transmitted and received by use of the TMDS (Transition Minimized Differential Signaling) channel.

Furthermore, the mobile-side second communication portion 120 further includes hardware for conducting communication based on the USB standard. The mobile-side second communication portion 120 includes: a USB connector; and an interface portion capable of transmitting and receiving image signals, audio signals, and various pieces of information related to image formats between itself and a device that outputs images and sounds.

The processor 130 is, for example, a CPU (Central Processing Unit). The processor 130 executes various programs stored in a mobile-side storage portion 140, which will be described later. The programs executed by the processor 130 include, for example, an application program 131-1, an application program 131-2, . . . , and an application program 131-N. In the following description, the individual application programs are genetically referred to as application program 131 (application function portion) unless they are required to be distinguished. Based on pieces of information acquired from the mobile-side first communication portion 110, the mobile-side second communication portion 120, the input reception portion 150, and the like, the application program 131 generates images to be displayed on the display portion 170. Furthermore, based on the acquired pieces of information, the application program 131 generates sounds to be produced from the speaker 180. The application program 131 outputs and displays the generated images to and on the display portion 170, and outputs and emits the generated sounds to and from the speaker 180.

The mobile-side storage portion 140 includes, for example, flash memory, RAM (Random Access Memory), register, and the like. The mobile-side storage portion 140 stores the programs to be executed by the processor 130.

The input reception portion 150 is, for example, a touchscreen, but may include various buttons and switches. The input reception portion 150 receives an input from the user, and outputs information indicative of the received operation to the processor 130.

The display portion 170 is, for example, a liquid crystal display panel or an organic EL (Electro Luminescence) display panel. The display portion 170 displays the images generated by the application program 131.

The speaker 180 emits the sounds generated by the application program 131.

An external communication portion 190 includes an antenna, a modulation portion, a coding/decoding portion, an up/down converter, and the like. The external communication portion 190 conducts communication via a mobile communication network and a wireless LAN, to thereby transmit and receive information between itself and, for example, servers present on the Internet.

The in-vehicle display unit 200 includes, for example: a vehicle-side first communication portion 210; a vehicle-side second communication portion 220; a processor 230; an in-vehicle equipment 240; an input reception portion (input portion) 250; a vehicle-side storage portion 260; a display portion (reproduction portion) 270; and a speaker (reproduction portion) 280. Similarly to the mobile-side first communication portion 110, the vehicle-side first communication portion 210 is a wireless communication module that conducts wireless communication based on the Bluetooth standard. The vehicle-side first communication portion 210 conducts communication between itself and the mobile-side first communication portion 110.

Similarly to the mobile-side second communication portion 120, the vehicle-side second communication portion 220 includes: hardware for conducting communication based on the HDMI standard; and hardware for conducting communication based on the USB standard. Namely, with the mobile-side second communication portion 120 and the vehicle-side second communication portion 220 being physically connected to each other by the HDMI cable or the USB cable, the mobile-type terminal 100 and the in-vehicle display unit 200 are capable of transmitting and receiving various images and sounds, and information indicative of an input from the user via the communication based on the HDMI standard or the communication based on the USB standard.

The processor 230 is, for example, a CPU of the in-vehicle display unit 200. The processor 230 executes various programs stored in the vehicle-side storage portion 260 (described later), to thereby implement the following software function portions. The processor 230 includes, as the software function portions, for example: an authentication portion 231; a vehicle-side information provision portion 232; a vehicle-side first communication control portion 233; a vehicle-side second communication control portion 234, and an output control portion 235.

The authentication portion 231 performs authentication necessary for the communication that is conducted between itself and the mobile-type terminal 100. The authentication portion 231 performs processing related to the authentication related to the communication conducted by the vehicle-side first communication portion 210 and processing related to the authentication related to the communication conducted by the vehicle-side second communication portion 220.

The vehicle-side information provision portion 232 is, for example, a functional portion for providing the mobile-type terminal 100 with vehicle information by means of the vehicle-side first communication portion 210, and performs an operation based on a dedicated protocol for transmitting and receiving vehicle information via wireless communication. In compliance with a request from the mobile-type terminal 100 to acquire vehicle information, the vehicle-side information provision portion 232 acquires various pieces of vehicle information from the in-vehicle equipment 240. On acquiring a request to acquire vehicle information from the mobile-type terminal 100, the vehicle-side information provision portion 232 outputs the vehicle information to the mobile-type terminal 100 in a predetermined cycle T1. The predetermined cycle T1 is, for example, approximately 500 milliseconds to 1 second. Furthermore, after outputting the acquired vehicle information to the vehicle-side first communication control portion 233, the vehicle-side information provision portion 232 causes the vehicle-side first communication control portion 233 to convert the acquired vehicle information to a PDU (Protocol Data Unit) that is transmittable by the vehicle-side first communication portion 210, and then to transmit the PDU to the mobile-type terminal 100. Note that the vehicle-side information provision portion 232 and the vehicle-side first communication control portion 233 may be a unified functional portion.

The vehicle-side first communication control portion 233 converts the vehicle information, which has been acquired from the vehicle-side information provision portion 232, to a PDU that is transmittable by the vehicle-side first communication portion 210. Then, the vehicle-side first communication control portion 233 causes the converted PDU to be transmitted from the vehicle-side first communication portion 210 to the mobile-type terminal 100.

The vehicle-side second communication control portion 234 converts the information, which has been converted to a PDU transmittable and receivable by the vehicle-side second communication portion 220 and is also related to various images and sounds to be acquired from the mobile-type terminal 100, to information in a format treatable in the in-vehicle equipment 240. Furthermore, the vehicle-side second communication control portion 234 converts the information, which is indicative of the input by the use that is acquired from an input reception portion 250 (described later), to a PDU that is transmittable and receivable by the vehicle-side first communication portion 210, and causes the vehicle-side second communication portion 220 to transmit the converted PDU to the mobile-type terminal 100.

The output control portion 235 outputs and displays the images, which have been converted to those in a format treatable by the vehicle-side second communication control portion 234, to and on the display portion 270, and outputs and emits the converted sounds to and from the speaker 280.

The in-vehicle equipment 240 is, for example, various sensors mounted in the vehicle, an ECU (Electronic Control Unit) that transmits and receives information via the CAN communication, or other units. The sensors mounted in the vehicle includes, for example, a speedometer and a tachometer, a suction pressure gauge, a supercharger pressure gauge, an exhaust gas temperature indicator, a voltmeter, an oil pressure gauge, an oil temperature gauge, a water temperature gauge, and the like.

The input reception portion 250 is, for example, a touch-screen, but may include various buttons and switches. The input reception portion 250 receives an input from the user, and outputs information indicative of the received operation (for example, information about the coordinates on which a touch operation is performed) to the processor 230.

The vehicle-side storage portion 260 includes, for example, RAM and register, or an HDD (Hard Disk Drive) and an SSD (Solid State Drive), or the like. The vehicle-side storage portion 260 stores various programs executed by the processor 230.

The display portion 270 is, for example, a liquid crystal display panel or an organic EL display panel. The display portion 270 displays images acquired from the output control portion 235.

The speaker 280 emits sounds acquired from the output control portion 235.

Figure 3:
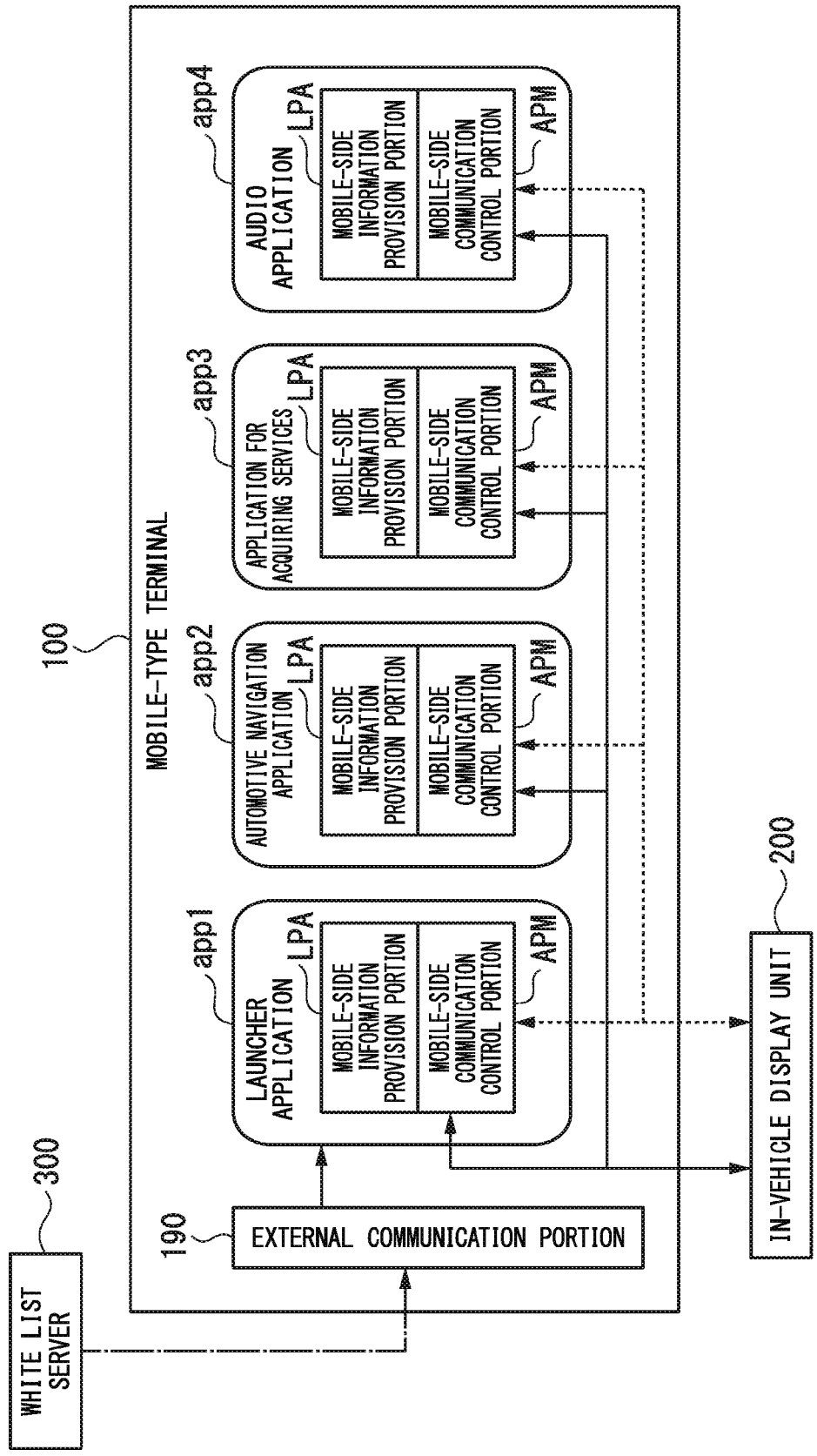
FIG. 3 is a first example of software configuration that implements a processor 130 of a mobile-type terminal 100 shown in FIG. 2.

FIG. 3 is an example of software configuration that implements the processor 130 of the mobile-type terminal 100 shown in FIG. 2. In the mobile-type terminal 100, the processor 130 executes various application programs, to thereby make it possible to activate applications app1 to app4. The application app1 is a launcher application, and makes the various applications that are able to communicate with the in-vehicle display unit 200 visible as a collection of links. Namely, the application app1 displays, on the display portion 170, images in which hyperlink destinations are represented as icons or the like. Furthermore, the application app1 has, as a while list, a list of applications that are allowed to conduct communication between the mobile-type terminal 100 and the in-vehicle display unit 200, and prohibits the applications not included in the white list from conducting communication between the mobile-type terminal 100 and the in-vehicle display unit 200.

The application app1 acquires the white list from a white list server 300 via the external communication portion 190 after every lapse of the predetermined cycle T2, to thereby update the white list. The predetermined cycle T2 is, for example, approximately several days. The white list server 300 stores the white list. Note that the update of the white list may be performed at the time when a new application is installed in the mobile-type terminal 100. Furthermore, in FIG. 3, the flow of information acquired via the external communication portion 190 is denoted with an arrow with a single-dotted line.

The application app2 is an application program with a function of automotive navigation. The application app3 is an application program capable of acquiring and utilizing a variety of services. The application app4 is an application program with a function of vehicle audio. In the example shown in FIG. 3, every application program includes a mobile-side information provision portion LPA and a communication control portion (mobile-side communication control portion) APM. The mobile-side information provision portion LPA is a functional portion for transmitting and receiving vehicle information by means of the mobile-side first communication portion 110, and is made of a dedicated protocol for transmitting and receiving vehicle information. In compliance with a request from each application program, the mobile-side information provision portion LPA transmits information, which is indicative of a request to acquire vehicle information, to the in-vehicle display unit 200 via the communication control portion APM. Here, in acquiring vehicle information, the applications app1 to app4 requests the mobile-side information provision portion LPA of each application program to acquire desired vehicle information from the in-vehicle display unit 200. This request is made by, for example, an API (Application Programming Interface) defined by the dedicated protocol constituting the mobile-side information provision portion LPA. Based on a predetermined API and on an argument indicative of the desired vehicle information, the applications app1 to app4 cause the mobile-side information provision portions LPA to acquire the desired vehicle information from the in-vehicle display unit 200. Furthermore, the mobile-side information provision portion LPA receives vehicle information from the in-vehicle display unit 200 via the communication control portion APM.

The communication control portion APM converts vehicle information and a request to acquire vehicle information to a PDU that is transmittable and receivable via wireless communication, and transmits and receives the converted PDU in the wireless communication that is conducted between the mobile-side first communication portion 110 and the vehicle-side first communication portion 210. Furthermore, the communication control portion APM converts various images and sounds, which are to be transmitted to the vehicle-side second communication portion 220, to a PDU transmittable and receivable by the mobile-side second communication portion 120, which conducts wired communication, and transmits the converted PDUs to the vehicle-side second communication portion 220. Furthermore, from the vehicle-side second communication portion 220 via the mobile-side first communication portion 110, the communication control portion APM acquires information that is indicative of an input from the user and has been converted to a PDU transmittable and receivable by the mobile-side second communication portion 120. Arrows with a solid line in FIG. 3 denote a flow of a request to acquire vehicle information and vehicle information. Furthermore, arrows with a broken line in FIG. 3 denote a flow of various images and sounds, and information indicative of an input from the user.

In this manner, each application program transmits and receives vehicle information by means of the mobile-side information provision portion LPA and the communication control portion APM, and transmits and receives various images and sounds, and information indicative of an input from the user by means of the communication control portion APM. Each of the application programs included in the aforementioned white list is capable of independently establish communication with the in-vehicle display unit 200 and of transmitting and receiving various pieces of information.

Figure 4:
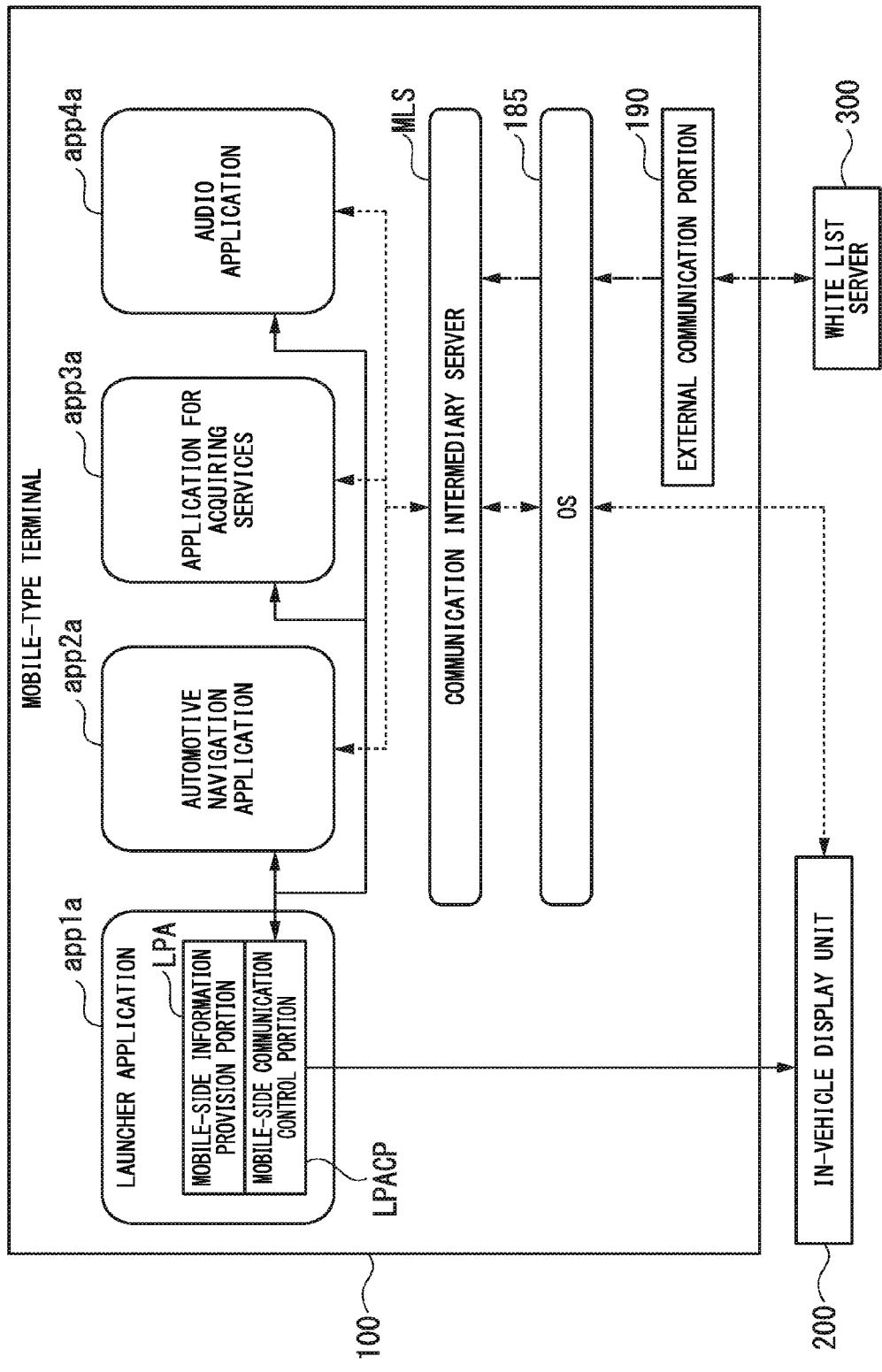
FIG. 4 is a second example of software configuration that implements the processor 130 of the mobile-type terminal 100 shown in FIG. 2.

FIG. 4 is another example of software configuration that implements the processor 130 of the mobile-type terminal 100 shown in FIG. 2. Similarly to the example shown in FIG. 3, with the processor 130 performing application programs, the mobile-type terminal 100 is capable of activating applications app1*a* to app4*a*, in the example shown in FIG. 4. The application app1 a includes: a mobile-side information provision portion LPA; and a mobile-side communication control portion LPACP. The mobile-side communication control portion LPACP converts vehicle information and a request to acquire vehicle information to a PDU that is transmittable and receivable via wireless communication, and transmits and receives the converted PDU in the wireless communication that is performed between the mobile-side first communication portion 110 and the vehicle-side first communication portion 210. A communication intermediary server MLS is, for example, a piece of remote desktop software. As a preferable example that implement this, a MirrorLink (registered trademark) server or the like is available. The communication intermediary server MLS has a function of converting information that is to be transmitted and received by the mobile-side second communication portion 120 to a PDU that is transmittable and receivable by the mobile-side second communication portion 120. The communication intermediary server MLS transmits and receives the converted PDU between the mobile-side second communication portion 120 and the vehicle-side second communication portion 220 via an OS 185. Namely, the mobile-side communication control portion LPACP and the communication intermediary server MLS shown in FIG. 4 are functional portions obtained by separating the respective functions from the communication control portion APM shown in FIG. 3. The applications app2*a* to app4*a* convert, via the communication intermediary server MLS, various images and sounds to PDUs that are transmittable and receivable by the mobile-side second communication portion 120, and transmit the converted PDUs to the vehicle-side second communication portion 220.

Furthermore, in the example of FIG. 4, the communication intermediary server MLS manages the white list. Via the OS 185 and the external communication portion 190, the communication intermediary server MLS updates the white list from the white list server 300 after every lapse of the predetermined cycle T2. The OS 185 is an operating system, for example, an Android (registered trademark) OS.

Here, in acquiring vehicle information, the applications app2*a* to app4*a* request the mobile-side information provision portions LPA of the application app1*a* to acquire desired vehicle information from the in-vehicle display unit 200. This request is made by, for example, an API defined by the dedicated protocol that constitutes the mobile-side information provision portion LPA. Based on a predetermined API and on an argument indicative of the desired vehicle information, the applications app2*a* to app4*a* cause the mobile-side information provision portions LPA to acquire the desired vehicle information from the in-vehicle display unit 200. Therefore, through the application app1*a* as a launcher application, the applications app2*a* to app4*a* make a request to acquire vehicle information to the in-vehicle display unit 200. In summary, in the example of FIG. 4, only through the launcher application, the application programs acquire vehicle information via the mobile-side first communication portion 110 and the vehicle-side first communication portion 210 while, as for various images and sounds, and information indicative of an input from the user, the communication intermediary server MLS transmits and receives them via the mobile-side second communication portion 120 and the vehicle-side second communication portion 220. Note that request(s) to acquire vehicle information to the in-vehicle display unit 200 may be performed with pieces of vehicle information specified separately, but may be performed with pieces of vehicle information specified in a batch.

Figure 5:
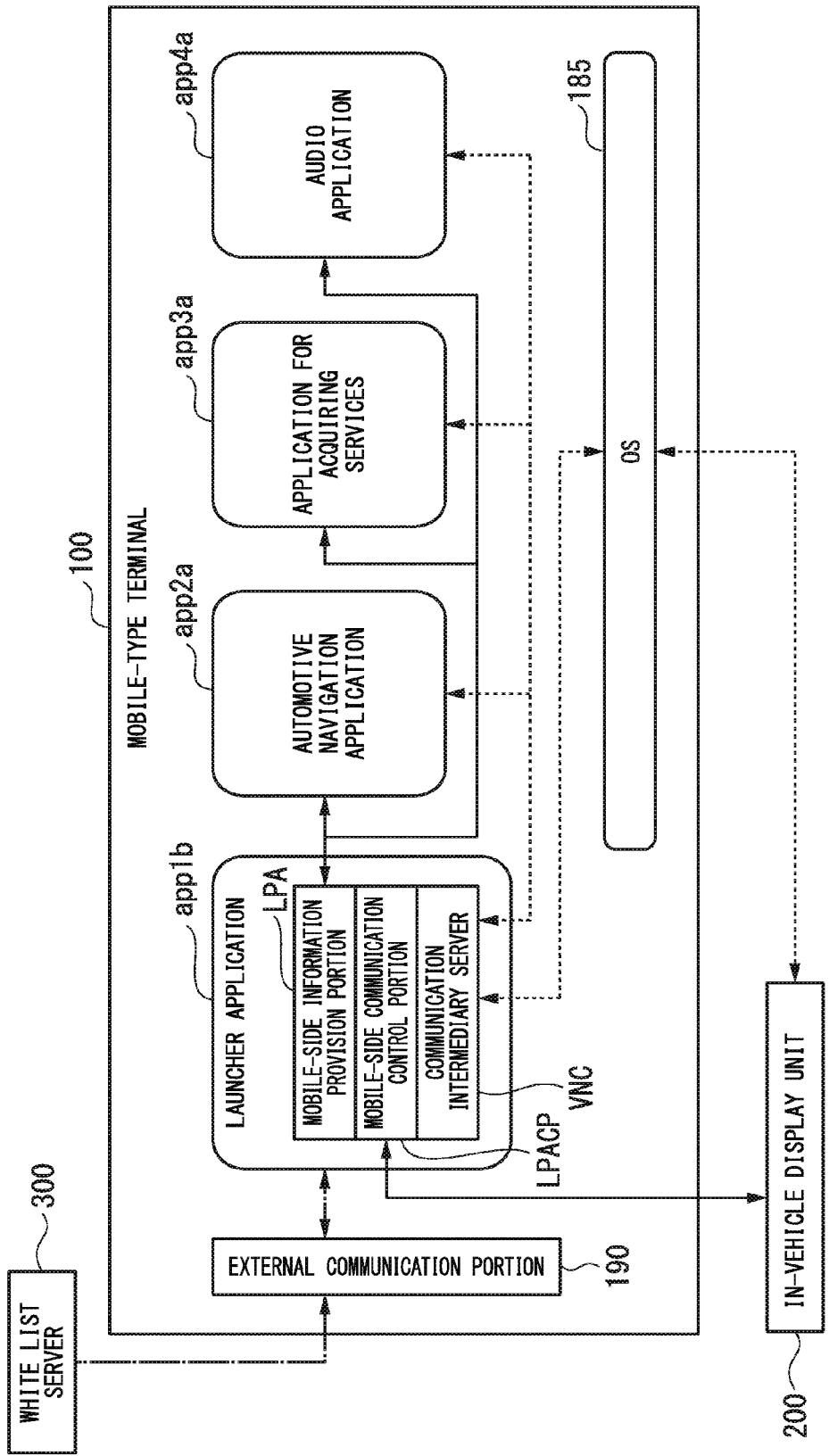
FIG. 5 is a third example of software configuration that implements the processor 130 of the mobile-type terminal 100 shown in FIG. 2.

FIG. 5 is a still another example of software configuration that implements the processor 130 of the mobile-type terminal 100 shown in FIG. 2. In the example shown in FIG. 5, the communication intermediary server MLS shown in FIG. 4 is included as a communication intermediary server VNC in an app1*b*, which is a launcher application. The communication intermediary server VNC is, for example, remote desktop software. Preferable examples that implement this include a VNC (Virtual Network Computing) server and the like. Therefore, the applications app2*a* to app4*a* conduct communication between the mobile-side first communication portion 110 and the vehicle-side first communication portion 210, and communication between the mobile-side second communication portion 120 and the vehicle-side second communication portion 220, via the application app1*a* as a launcher application. Furthermore, in the case of FIG. 5, the application app1*a* manages the white list similarly to the example shown in FIG. 3.

Figure 6:
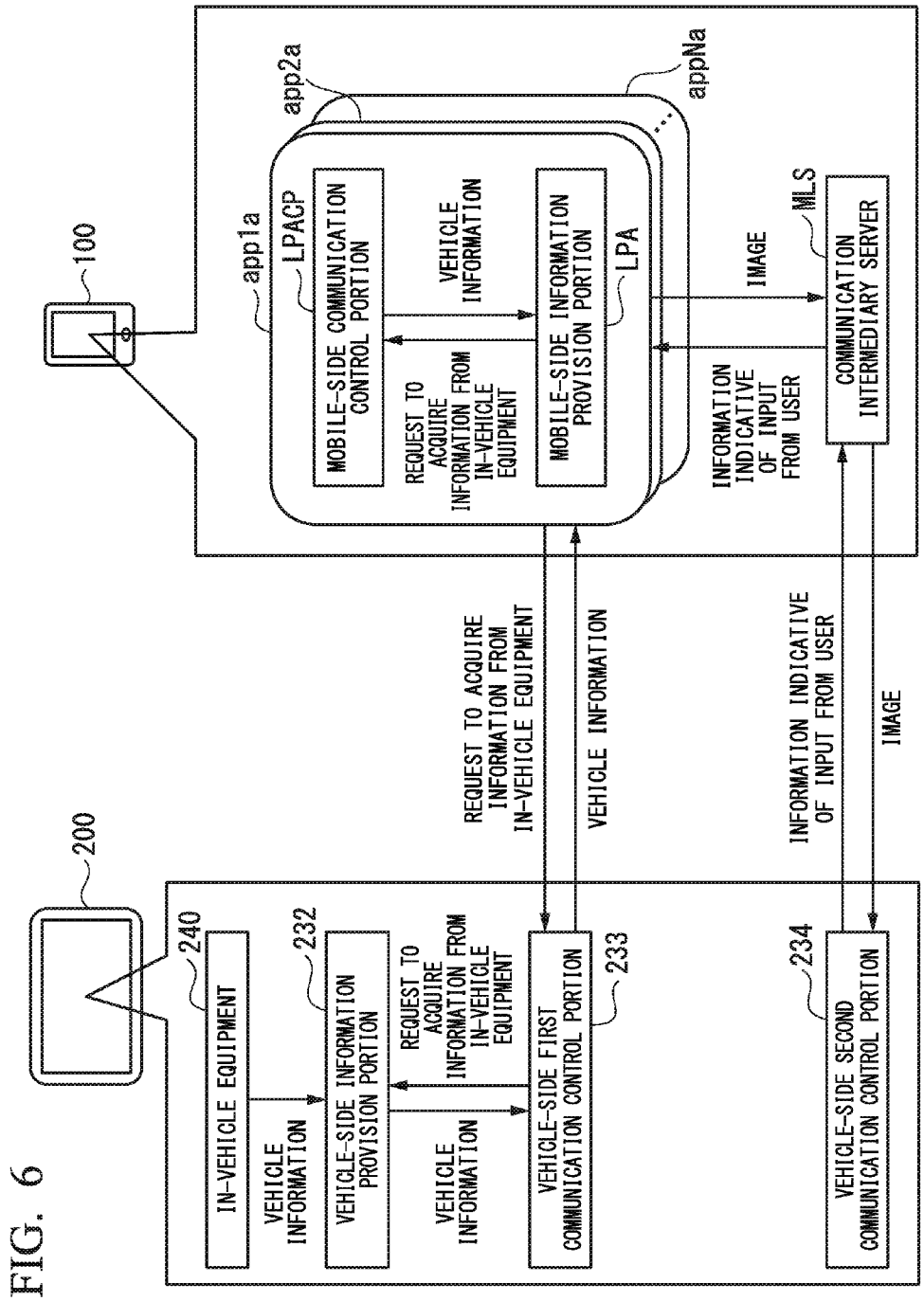
FIG. 6 is a diagram showing an example of software configuration of the electronic communication system 1 and a flow of pieces of information in a first embodiment.

FIG. 6 is a diagram showing an example of flows of pieces of information in the electronic communication system 1. The software configuration shown in FIG. 6 is based on the example of FIG. 4. Firstly, the in-vehicle display unit 200 receives an input from the user, causes the vehicle-side second communication control portion 234 to convert information indicative of the input received from the user to a PDU that is transmittable by the vehicle-side second communication portion 220, and transmits the converted PDU to the mobile-type terminal 100 over the cable Cbl. The communication intermediary server MLS of the mobile-type terminal 100 converts the information indicative of the input from the user, which has been acquired over the cable Cbl, converts to information in a format that is treatable by the mobile-type terminal 100, and outputs the converted information indicative of the input from the user to the application app1a. The application app1a performs processing based on the acquired information indicative of the input from the user. Here, it is presumed that the application app1a performs processing related to the operation of displaying vehicle information of the automobile (Car). In performing this processing, the application app1a transmits an acquisition request of vehicle information to the in-vehicle display unit 200 through the mobile-side information provision portion LPA. Note that this vehicle information refers to, for example, information indicative of the speed of the automobile (Car).

A specific operation of the application app1a related to the acquisition request of vehicle information will be described in detail below. The mobile-side information provision portion LPA outputs an acquisition request of vehicle information to the mobile-side communication control portion LPACP. The mobile-side communication control portion LPACP converts the acquired acquisition request of vehicle information to a PDU transmittable by the mobile-side first communication portion 110, and transmits the acquisition request of the vehicle information, which has been converted to a transmittable PDU, to the in-vehicle display unit 200 via wireless communication.

The vehicle-side first communication control portion 233 of the in-vehicle display unit 200 outputs the acquisition request of vehicle information, which has been acquired via wireless communication, to the vehicle-side information provision portion 232. Based on the acquired acquisition request of vehicle information, the vehicle-side information provision portion 232 reads the requested vehicle information from the in-vehicle equipment 240. The vehicle-side information provision portion 232 outputs the read vehicle information to the vehicle-side first communication control portion 233. The vehicle-side first communication control portion 233 converts the acquired vehicle information to a PDU transmittable by the vehicle-side first communication portion 210, and transmits the converted PDU to the mobile-type terminal 100.

The mobile-side communication control portion LPACP of the application app1a converts the vehicle information, which has been acquired via wireless communication, to information in a format treatable by the mobile-type terminal 100, and outputs the converted vehicle information to the mobile-side information provision portion LPA. The mobile-side information provision portion LPA outputs the acquired vehicle information to the application app1a. Based on the acquired vehicle information, the application app1a generates various images, and transmits the generated images to the vehicle-side second communication control portion 234 via the communication intermediary server MLS. At this time, the communication intermediary server MLS converts the images to PDUs transmittable by the mobile-side second communication portion 120, and then transmits them to the in-vehicle display unit 200.

Figure 7:
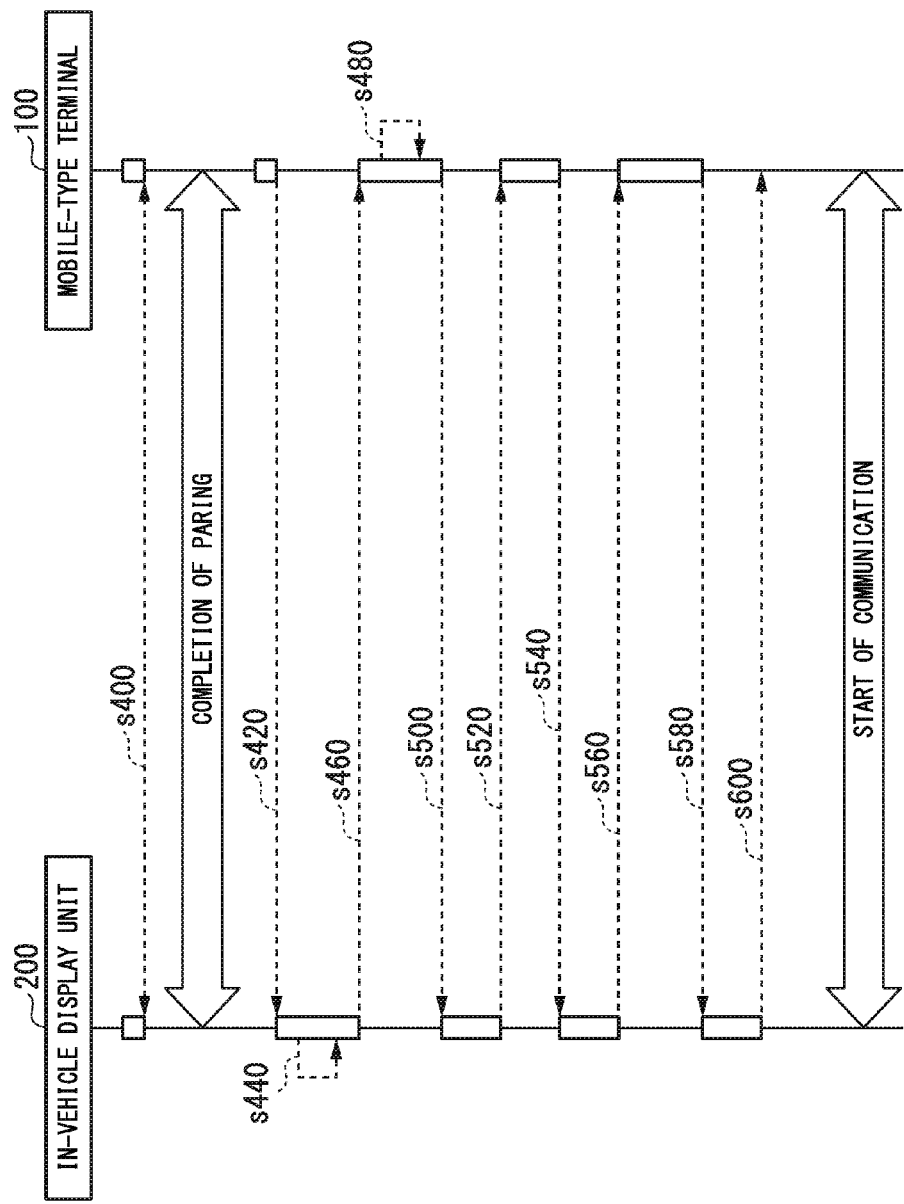
FIG. 7 is a sequence diagram for explaining an example of flow of operation related to authentication that is performed between a mobile-type terminal 100 provided with the software configuration shown in FIG. 3 and an in-vehicle display unit 200.

FIG. 7 is a sequence diagram for explaining an example of flow of operations related to authentication performed between the mobile-type terminal 100 with the software configuration shown in FIG. 3 and the in-vehicle display unit 200.

(Step S400: paring processing)

Firstly, the mobile-type terminal 100 and the in-vehicle display unit 200 performs pairing related to wireless communication, via the mobile-side first communication portion 110 and the vehicle-side first communication portion 210. Here, the pairing is made by use of, for example, HFP (Hands-Free Profile).

(Step S420: connection by cable Cbl)

Next, after the mobile-type terminal 100 and the in-vehicle display unit 200 are paired, the mobile-type terminal 100 and the in-vehicle display unit 200 are connected by the user, who uses the cable Cbl to wiredly connect between the mobile-side second communication portion 120 and the vehicle-side second communication portion 220. Here, the cable Cbl is, for example, an HDMI cable.

(Step S440)

Next, when connected to the mobile-type terminal 100 by the cable Cbl in step S420, the in-vehicle display unit 200 displays a start button for the launcher application on the display portion 270. Note that the start button for the launcher application is displayed even if the steps S400 and S420 are in the reverse order. Namely, the in-vehicle display unit 200 displays the start button for the launcher application only when both of the pairing related to wireless communication and the connection by the cable Cbl are performed. Below is a description for the case where the start button for the launcher application is tapped by the user (i.e., the start of the launcher application is selected).

(Step S460: request to start launcher application)

Next, the in-vehicle display unit 200 transmits a request to start the launcher application to the mobile-type terminal 100 via the vehicle-side first communication portion 210 and the mobile-side first communication portion 110.

(Step S480)

Next, based on the received request to start the launcher application, the mobile-type terminal 100 starts the launcher application.

(Step S500: authentication information of communication control portion)

Nest, the mobile-type terminal 100 transmits authentication information of the communication control portion APM to the in-vehicle display unit 200 via the mobile-side second communication portion 120 and the vehicle-side second communication portion 220, to thereby perform authentication between the communication control portion APM and the vehicle-side first communication control portion 233.

(Step S520: completion of authentication of communication control portion)

Next, based on the acquired authentication information, the authentication portion 231 of the in-vehicle display unit 200 performs authentication, and transmits information indicative of completion of the authentication of the communication control portion APM or information indicative of authentication error to the mobile-type terminal 100 via the vehicle-side second communication portion 220 and the mobile-side second communication portion 120. Below is a description for the case where information indicative of completion of the authentication is transmitted.

(Step S540: affirmative response)

Next, on acquiring the information indicative of completion of the authentication of the communication control portion APM, the mobile-type terminal 100 transmits an affirmative response to the in-vehicle display unit 200 via the mobile-side second communication portion 120 and the vehicle-side second communication portion 220.

(Step S560: request to start authentication of information provision portion)

Next, on acquiring the affirmative response, the in-vehicle display unit 200 transmits a request to start authentication of an information provision portion to the mobile-type terminal 100 via the vehicle-side first communication portion 210 and the mobile-side first communication portion 110 in order to perform authentication between the vehicle-side information provision portion 232 and the mobile-side information provision portion LPA.

(Step S580: authentication information of information provision portion)

Next, in response to the acquired request to start authentication, the mobile-type terminal 100 transmits the authentication information of the mobile-side information provision portion LPA to the in-vehicle display unit 200 via the mobile-side first communication portion 110 and the vehicle-side first communication portion 210. Here, the authentication information of the mobile-side information provision portion LPA is, for example, a UUID (Universally Unique Identifier) that uniquely identifies software, SIM (Subscriber Identity Module) information of the mobile-type terminal 100, or the like.

(Step S600: completion of authentication of information provision portion+encryption key)

Next, based on the acquired authentication information of the mobile-side information provision portion LPA, the authentication portion 231 of the in-vehicle display unit 200 performs authentication. When the authentication is completed, the in-vehicle display unit 200 transmits information indicative of completion of authentication together with an encryption key necessary for encryption and decryption of the information, which is transmitted and received between the mobile-side information provision portion LPA and the vehicle-side information provision portion 232, to the mobile-type terminal 100 via the vehicle-side first communication portion 210 and the mobile-side first communication portion 110. With the encryption and decryption by means of the encryption key, the electronic communication system 1 is allowed to transmit and receive vehicle information more safely, to thereby make it possible to, for example, prevent interference to information among application programs in action in the mobile-type terminal 100.

Figure 8:
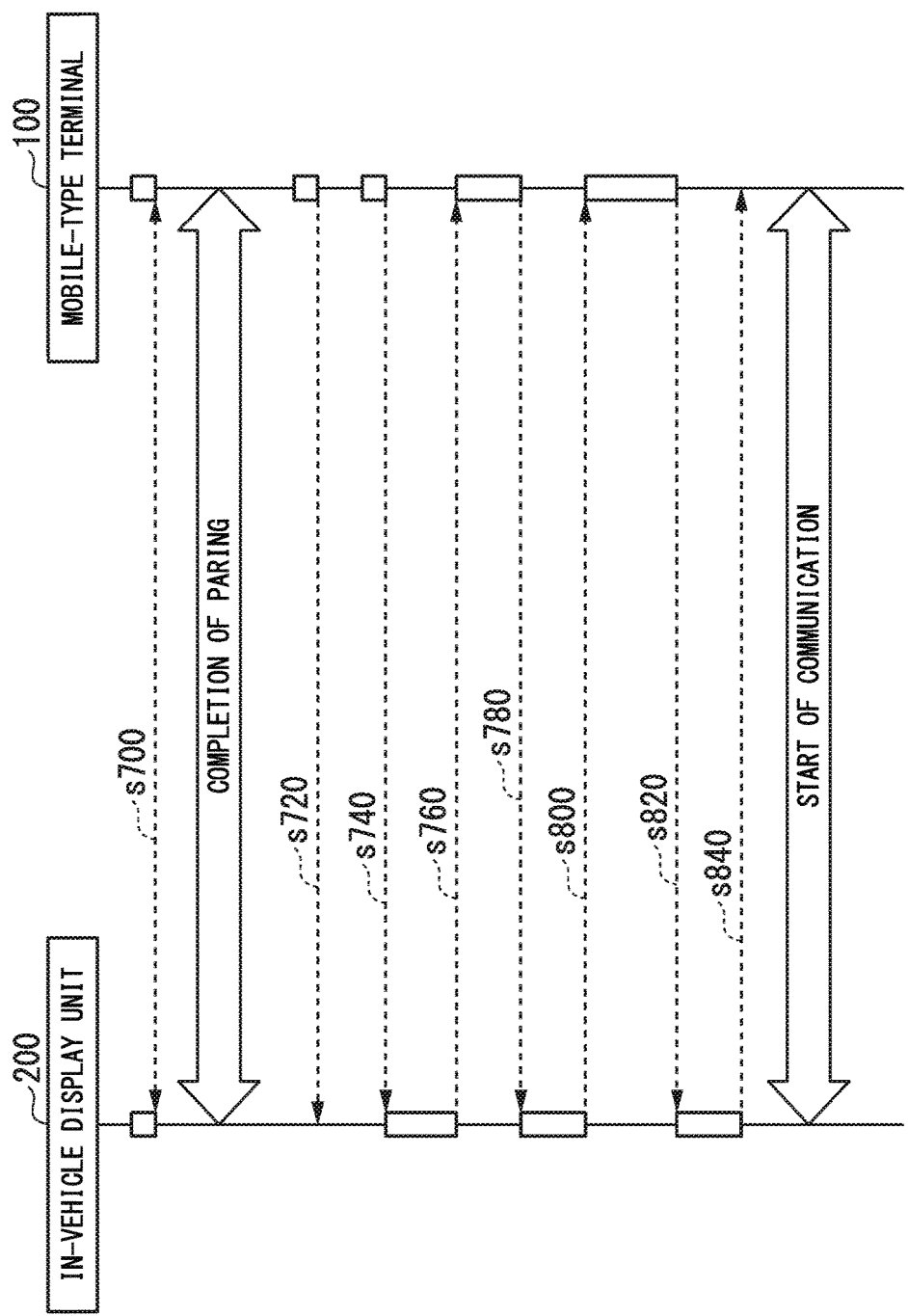
FIG. 8 is a sequence diagram for explaining an example of flow of operation related to authentication that is performed between a mobile-type terminal 100 provided with the software configuration shown in FIGS. 4, 5 and an in-vehicle display unit 200.

FIG. 8 is a sequence diagram for explaining an example of flow of operations related to authentication performed between the mobile-type terminal 100 provided with the software configuration shown in FIGS. 4, 5 and the in-vehicle display unit 200.

(Step S700: pairing processing)

Firstly, the mobile-type terminal 100 and the in-vehicle display unit 200 perform pairing related to wireless communication via the mobile-side first communication portion 110 and the vehicle-side first communication portion 210.

(Step S720: connection by cable Cbl)

Next, after the mobile-type terminal 100 and the in-vehicle display unit 200 are paired, the mobile-type terminal 100 and the in-vehicle display unit 200 are wiredly connected by the user by use of the cable Cbl. Here, the cable Cbl is, for example, a USB cable.

(Step S740: authentication information of communication intermediary server)

Next, when connected to the mobile-type terminal 100 by the cable Cbl in step S720, the in-vehicle display unit 200 transmits authentication information of the communication intermediary server MLS via the vehicle-side second communication portion 220 and the mobile-side second communication portion 120, to thereby perform authentication between the communication intermediary server MLS and the vehicle-side first communication control portion 233. In the case where the HDMI cable is connected, the in-vehicle display unit 200 displays a start button for the launcher application on the display portion 270 similarly to step S440 of FIG. 7, and conducts the operations in steps S440 to S480 of FIG. 7. However, in the case where the USB cable is connected, the in-vehicle display unit 200 moves to the operation in step S760 instead of displaying the start button for the launcher application on the display portion 270.

(Step S760: completion of authentication of communication intermediary server)

Next, based on the acquired authentication information, the in-vehicle display unit 200 performs authentication, and transmits information indicative of completion of the authentication of the communication intermediary server MLS or information indicative of authentication error to the mobile-type terminal 100 via the vehicle-side second communication portion 220 and the mobile-side second communication portion 120. Below is a description for the case where information indicative of completion of authentication is transmitted.

(Step S780: affirmative response)

Next, on acquiring the information indicative of completion of authentication of the communication control portion APM, the mobile-type terminal 100 transmits an affirmative response to the in-vehicle display unit 200 via the mobile-side second communication portion 120 and the vehicle-side second communication portion 220.

(Step S800: request to start authentication of information provision portion)

Next, on acquiring the affirmative response, the in-vehicle display unit 200 transmits a request to start authentication of an information provision portion to the mobile-type terminal 100 via the vehicle-side first communication portion 210 and the mobile-side first communication portion 110 in order to perform authentication between the vehicle-side information provision portion 232 and the mobile-side information provision portion LPA.

(Step S820: authentication data of information provision portion)

Next, in response to the acquired request to start the authentication, the mobile-type terminal 100 transmits the authentication information of the mobile-side information provision portion LPA to the in-vehicle display unit 200 via the mobile-side first communication portion 110 and the vehicle-side first communication portion 210.

(Step S840: completion of authentication of information provision portion+encryption key)

Next, based on the acquired authentication information of the mobile-side information provision portion LPA, the in-vehicle display unit 200 performs authentication. When the authentication is completed, the in-vehicle display unit 200 transmits information indicative of completion of the authentication together with an encryption key necessary for encryption and decryption of information, which is transmitted and received between the mobile-side information provision portion LPA and the vehicle-side information provision portion 232, to the mobile-type terminal 100 via the vehicle-side first communication portion 210 and the mobile-side first communication portion 110.

Figure 9:
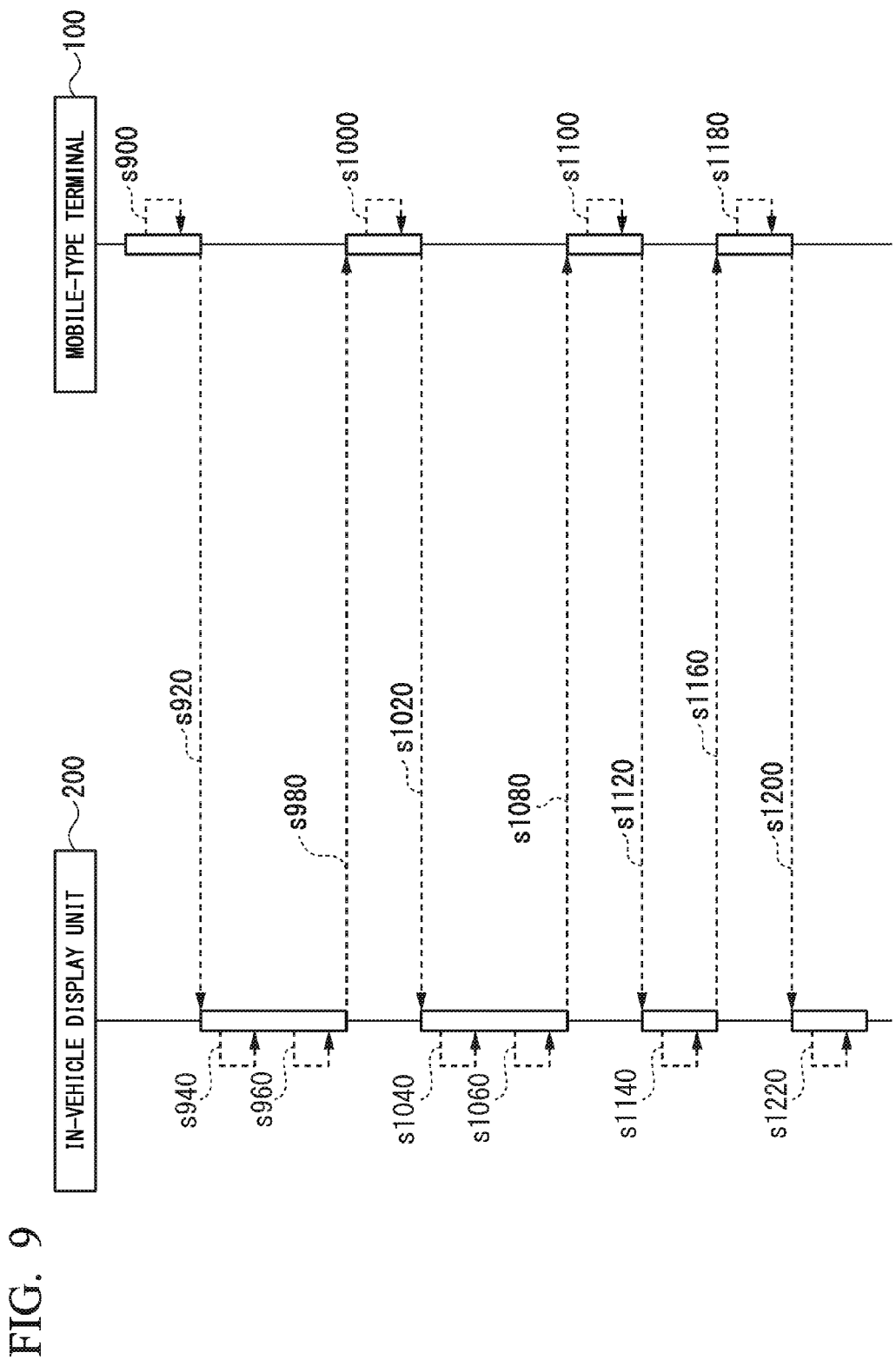
FIG. 9 is a sequence diagram for explaining an example of flow of operation that is performed between a mobile-type terminal 100 and an in-vehicle display unit 200.

FIG. 9 is a sequence diagram showing an example of flow of operations performed between the mobile-type terminal 100 and the in-vehicle display unit 200.

(Step S900)

Firstly, the mobile-type terminal 100 displays images of a list of application programs that have been made visible by the launcher application and are also allowed to communicate with the in-vehicle display unit 200.

(Step S920: currently-displayed image)

Next, the mobile-type terminal 100 transmits the image, which is shown on its own unit, to the in-vehicle display unit 200 via the mobile-side second communication portion 120 and the vehicle-side second communication portion 220.

(Step S940)

Next, the in-vehicle display unit 200 displays the received image on the display portion 270 of its own unit.

(Step S960)

Next, the in-vehicle display unit 200 receives an input from the user by means of the input reception portion 250.

(Step S980: information indicative of input from user (selection/start of navigation application))

Next, the in-vehicle display unit 200 transmits information indicative of the received input from the user to the mobile-type terminal 100 via the vehicle-side second communication portion 220 and the mobile-side second communication portion 120. Here, the input from the user is information indicative of selection/start of a navigation application out of the list of application programs that are displayed on the display portion 270.

(Step S1000)

Next, the mobile-type terminal 100 receives the information indicative of the input from the user. Based on the received information, the mobile-type terminal 100 selects/starts the navigation application. Then, the mobile-type terminal 100 displays an image of the started navigation application on the display portion 170. Here, it is presumed that, in the image of the started navigation application, a navigation menu is drawn.

(Step S1020: currently-displayed image)

Next, the mobile-type terminal 100 transmits the image displayed on its own unit to the in-vehicle display unit 200 via the mobile-side second communication portion 120 and the vehicle-side second communication portion 220.

(Step S1040)

Next, the in-vehicle display unit 200 displays the received image on the display portion 270 of its own unit.

(Step S1060)

Next, the in-vehicle display unit 200 receives an input from the user by means of the input reception portion 250.

(Step S1080: information indicative of input from user (selection/entry of menu))

Next, the in-vehicle display unit 200 transmits information indicative of the received input from the user to the mobile-type terminal 100 via the vehicle-side second communication portion 220 and the mobile-side second communication portion 120. Here, it is presumed that the input from the user is information for selecting/entering the display of the current position and current moving speed out of the menu of the navigation applications that is displayed on the display portion 270.

(Step S1100)

Next, the mobile-type terminal 100 receives information indicative of the input from the user. Based on the received information, the mobile-type terminal 100 displays, on the display portion 170, the information for selecting/entering the display of the current position and current moving speed.

(Step S1120: request to acquire vehicle information)

Next, the mobile-type terminal 100 transmits a request to acquire the vehicle information that is necessary for displaying the current position and current moving speed to the in-vehicle display unit 200 via the mobile-side first communication portion 110 and the vehicle-side first communication portion 210.

(Step S1140)

Next, based on the request to acquire the vehicle information necessary for displaying the current position and current moving speed, the in-vehicle display unit 200 acquires vehicle information.

(Step S1160: vehicle information)

Next, the in-vehicle display unit 200 transmits the acquired vehicle information to the mobile-type terminal 100 via the vehicle-side first communication portion 210 and the mobile-side first communication portion 110.

(Step S1180)

Next, based on the acquired vehicle information, the mobile-type terminal 100 generates an image to be displayed, namely, an image in which the current position and current moving speed are drawn. Then, the mobile-type terminal 100 displays the generated image on the display portion 170.

(Step S1200: currently-displayed image+sound to be emitted)

Next, the mobile-type terminal 100 transmits the imaged displayed on its own unit and the sound to be emitted to the in-vehicle display unit 200 via the mobile-side second communication portion 120 and the vehicle-side second communication portion 220.

(Step S1220)

Next, the in-vehicle display unit 200 displays the received image on the display portion 270 of its own unit. After this, the mobile-type terminal 100 and the in-vehicle display unit 200 repeat the flow of these operations.

Thus, in the electronic communication system 1 according to the first embodiment, communication is performed between the mobile-type terminal 100 and the in-vehicle display unit 200 on two communication systems. The in-vehicle display unit 200 transmits vehicle information to the mobile-type terminal 100 via communication to first communication specifications (for example, the aforementioned wireless communication) while the mobile-type terminal 100 transmits various images or sounds, which have been generated in its own unit, to the in-vehicle display unit 200 via communication to second communication specifications (for example, the aforementioned wired communication). Therefore, in the in-vehicle display unit 200, it is possible to reproduce the various images and sounds that have been generated in the mobile-type terminal 100 based on the vehicle information.

Furthermore, the mobile-type terminal 100 of the electronic communication system 1 receives a request from the application program 131 via the API, and transmits the received request to the in-vehicle display unit 200, to thereby acquire the information that has been acquired by the side of the in-vehicle display unit 200. Therefore, it is possible to improve the compatibility of application programs.

Furthermore, the electronic communication system 1 performs authentication processing according to the wired, second communication specifications. Therefore, the mobile-type terminal 100 and the in-vehicle display unit 200 that adopt various types of second communication specifications are capable of communicating with each other.

Furthermore, in the electronic communication system 1, when a physical connection for conducting communication to the wired, second communication specifications is established between the mobile-type terminal 100 and the in-vehicle display unit 200, the in-vehicle display unit 200 displays the start button of the launcher application. Then, in the case where the start button of the launcher application is tapped, authentication related to communication to the first communication specifications and authentication related to communication to the second communication specifications are started. Therefore, it is possible to inhibit unintentional operations by the user.

While an embodiment of the present invention has been described in detail above with reference to the drawings, specific configurations are not limited to this embodiment. Modifications, replacements, omissions, and so on may be made without departing from the spirit or scope of the present invention.

<Hardware Configuration and so on>

Note that a program for implementing the processings of the functional portions of the electronic communication system 1 according to the aforementioned embodiments may be recorded in a recording medium readable by computers. Then, the program recorded in the recording medium may be caused to be read by a computer system and executed. Thereby, the aforementioned processings related to the electronic communication system 1 may be performed. The "computer system" here includes an OS (Operation System) and hardware such as a peripheral device.

Furthermore, in the case where the WWW system is utilized, the "computer system" additionally includes an environment of providing (or an environment of displaying) web pages.

Furthermore, the "recording medium readable by computers" refers to: a portable medium such as a flexible disk, a magneto optical disk, a ROM, and a CD-ROM; and a storage device such as a hard disk built in a computer system. Furthermore, the "recording medium readable by computers" additionally includes: one that dynamically retains a program for a short period of time, such as a communication line in the case where a program is transmitted over a communication line such as a network including the Internet and a telephone line; and one that retains a program for a given period of time such as internal volatile memory of a computer system that functions as a server or a client for the aforementioned case where a program is transmitted over a communication line. Furthermore, the aforementioned program may be one for implementing a part of the aforementioned functions. Furthermore, the aforementioned program may be one that is capable of achieving the aforementioned functions by being combined with a program already recorded in the computer system.

As described above, an electronic communication system (1) according to the present embodiment includes: a mobile-type terminal (100); and an in-vehicle unit (200) that communicates with the mobile-type terminal (100), wherein the mobile-type terminal (100) includes: a mobile-side first communication portion (110) that receives information, which the in-vehicle unit (200) has acquired in a motor vehicle, via communication to a first communication specification; a mobile-side second communication portion (120) that transmits an image or a sound, which has been generated in the mobile-type terminal (100), to the in-vehicle unit (200) via communication to a second communication specification; and an application functional portion (131) that generates the image or the sound based on information received from the in-vehicle unit (200), and wherein the in-vehicle unit (200) includes: a vehicle-side first communication portion (210) that transmits information, which the in-vehicle unit (200) has acquired in the motor vehicle, to the mobile-type terminal (100) via the communication to the first communication specification; a vehicle-side second communication portion (220) that receives the image or the sound, which has been generated in the mobile-type terminal (100), via the communication to the second communication specification; and reproduction portions (270, 280) that reproduce the image or the sound that has been received. Furthermore, the mobile-type terminal (100) may further include an information provision portion that receives a request from the application functional portion (131) via an API (Application Programming Interface), that controls the mobile-side first communication portion (110) so as to transmit the received request to the in-vehicle unit (200), and that provides the application functional portion (131) with the information, which the mobile-side first communication portion (110) has received from the in-vehicle unit (200), as a response to the API. Furthermore the in-vehicle unit (200) may adopt a wired communication specification as the second communication specification, and may further include an authentication portion (231) that, when communication to the first communication specification is conducted and also a physical connection for conducting communication to the second communication specification is established, performs authentication processing according to the second communication specification. Furthermore, the in-vehicle unit (200) may further include an input portion (250) that receives an input operation from a user, and wherein, when communication to the first communication specification is conducted and also a physical connection for conducting communication to the second communication specification is established, the authentication portion (231) may do an output of inquiring whether to start transmission of information, which the in-vehicle unit (200) has acquired via in-vehicle communication, to the mobile-type terminal (100) via communication to the first communication specification or not if the second communication specification is a given communication specification, and the authentication portion (231) may perform authentication processing for starting the transmission if an input operation indicative of affirmation to the inquiry is performed to the input portion (250). Furthermore, an in-vehicle unit (200) according to the present embodiment is an in-vehicle unit (200) that communicates with a mobile-type terminal (100), includes: a first communication portion (210) that transmits information, which is acquirable in a motor vehicle provided with the in-vehicle unit (200), to the mobile-type terminal (100) via communication to a first communication specification; a second communication portion (220) that receives an image or a sound, which has been generated in the mobile-type terminal (100), via communication to a wired, second communication specification; reproduction portions (270, 280) that reproduce the image or the sound that has been received; and an authentication portion (231) that, when the communication to the first communication specification is conducted and also a physical connection for conducting the communication to the second communication specification is established, performs authentication processing according to the second communication specification. Furthermore, the in-vehicle unit (200) may further include an input portion (250) that receives an input operation from a user, wherein, when communication to the first communication specification is conducted and also a physical connection for conducting the communication to the second communication specification is established, the authentication portion (231) may do an output of inquiring whether to start transmission of information, which the in-vehicle unit (200) has acquired via in-vehicle communication, to the mobile-type terminal (100) via communication to the first communication specification or not if the second communication specification is a given communication specification, and the authentication portion (231) may perform authentication processing for starting the transmission if the input portion (250) receives information indicative of affirmation to the inquiry as an input from the user. Furthermore, a control method of an electronic communication system (1) according to the present embodiment includes a mobile-type terminal (100) and an in-vehicle unit (200) that communicates with the mobile-type terminal (100), wherein the mobile-type terminal (100): receives information, which the in-vehicle unit (200) has acquired in a motor vehicle, via communication to a first communication specification; transmits an image or a sound, which has been generated in the mobile-type terminal (100), to the in-vehicle unit (200) via communication to a second communication specification; and generates the image or the sound based on information received from the in-vehicle unit (200), and wherein the in-vehicle unit (200): transmits information, which the in-vehicle unit (200) has acquired in the motor vehicle, to the mobile-type terminal (100) via communication to the first communication specification; receives the image or the sound, which has been generated in the mobile-type terminal (100), via communication to the second communication specification; and reproduces the image or the sound that has been received.

BRIEF DESCRIPTION OF THE REFERENCE SYMBOLS

1: electronic communication system
100: mobile-type terminal
110: mobile-side first communication portion
120: mobile-side second communication portion
130: processor
131, 131-1, 131-2, 131-N: application program
140: mobile-side storage portion
150: input reception portion
170: display portion
180: speaker
185: OS
190: external communication portion
200: in-vehicle display unit
210: vehicle-side first communication portion
220: vehicle-side second communication portion
230: processor
231: authentication portion
232: vehicle-side information provision portion
233: vehicle-side first communication control portion
234: vehicle-side second communication control portion
235: output control portion
240: in-vehicle equipment
250: input reception portion
260: vehicle-side storage portion
270: display portion
280: speaker
300: white list server

The invention claimed is:

1. An electronic communication system, comprising:
a mobile terminal; and
an in-vehicle unit that communicates with the mobile terminal,
wherein the mobile terminal comprises:
a mobile-side first communication portion that receives information, which the in-vehicle unit has acquired in a motor vehicle, via communication to a first communication specification;
a mobile-side second communication portion that transmits an image or a sound, which has been generated in the mobile terminal, to the in-vehicle unit via communication to a second communication specification; and
an application functional portion that generates the image or the sound based on information received from the in-vehicle unit, and
wherein the in-vehicle unit comprises:
a vehicle-side first communication portion that transmits information, which the in-vehicle unit has acquired in the motor vehicle, to the mobile terminal via the communication to the first communication specification;
a vehicle-side second communication portion that receives the image or the sound, which has been generated in the mobile terminal, via the communication to the second communication specification; and
reproduction portions that reproduce the image or the sound that has been received.

2. The electronic communication system according to claim 1,
wherein the mobile terminal further comprises an information provision portion that receives a request from the application functional portion via an API (Application Programming Interface), that controls the mobile-side first communication portion so as to transmit the received request to the in-vehicle unit, and that provides the application functional portion with the information, which the mobile-side first communication portion has received from the in-vehicle unit, as a response to the API.

3. The electronic communication system according to claim 2,
wherein the in-vehicle unit adopts a wired communication specification as the second communication specification, and further comprises an authentication portion that, when communication to the first communication specification is conducted and also a physical connection for conducting communication to the second communication specification is established, performs authentication processing according to the second communication specification.

4. The electronic communication system according to claim 3,
wherein the in-vehicle unit further comprises
an input portion that receives an input operation from a user, and
wherein, when communication to the first communication specification is conducted and also a physical connection for conducting communication to the second communication specification is established, the authentication portion does an output of inquiring whether to start transmission of information, which the in-vehicle unit has acquired via in-vehicle communication, to the mobile terminal via communication to the first communication specification or not if the second communication specification is a given communication specification, and the authentication portion performs authentication processing for starting the transmission if an input operation indicative of affirmation to the inquiry is performed to the input portion.

5. The electronic communication system according to claim 1,
wherein the in-vehicle unit adopts a wired communication specification as the second communication specification, and further comprises an authentication portion that, when communication to the first communication specification is conducted and also a physical connection for conducting communication to the second communication specification is established, performs authentication processing according to the second communication specification.

6. The electronic communication system according to claim 5,
wherein the in-vehicle unit further comprises
an input portion that receives an input operation from a user, and
wherein, when communication to the first communication specification is conducted and also a physical connection for conducting communication to the second communication specification is established, the authentication portion does an output of inquiring whether to start transmission of information, which the in-vehicle unit has acquired via in-vehicle communication, to the mobile terminal via communication to the first communication specification or not if the second communication specification is a given communication specification, and the authentication portion performs authentication processing for starting the transmission if an input operation indicative of affirmation to the inquiry is performed to the input portion.

7. An in-vehicle unit that communicates with a mobile terminal, comprising:
a first communication portion that transmits information, which is acquirable in a motor vehicle provided with the in-vehicle unit, to the mobile terminal via communication to a first communication specification;
a second communication portion that receives an image or a sound, which has been generated in the mobile terminal, via communication to a wired, second communication specification;
reproduction portions that reproduce the image or the sound that has been received; and
an authentication portion that, when communication to the first communication specification is conducted and also a physical connection for conducting communication to the second communication specification is established, performs authentication processing according to the second communication specification.

8. The in-vehicle unit according to claim 7, further comprising an input portion that receives an input operation from a user,
wherein, when communication to the first communication specification is conducted and also a physical connection for conducting communication to the second communication specification is established, the authentication portion does an output of inquiring whether to start transmission of information, which the in-vehicle unit has acquired via in-vehicle communication, to the mobile terminal via communication to the first communication specification or not if the second communication specification is a given communication specification, and the authentication portion performs authentication processing for starting the transmission if the input portion receives information indicative of affirmation to the inquiry as an input from the user.

9. A control method of an electronic communication system, comprising
a mobile terminal and an in-vehicle unit that communicates with the mobile terminal,
wherein the mobile terminal:
receives information, which the in-vehicle unit has acquired in a motor vehicle, via communication to a first communication specification;
transmits an image or a sound, which has been generated in the mobile terminal, to the in-vehicle unit via communication to a second communication specification; and
generates the image or the sound based on information received from the in-vehicle unit, and
wherein the in-vehicle unit:
transmits information, which the in-vehicle unit has acquired in the motor vehicle, to the mobile terminal via communication to the first communication specification;
receives the image or the sound, which has been generated in the mobile terminal, via communication to the second communication specification; and
reproduces the image or the sound that has been received.

* * * * *